United States Patent
Stewart

(10) Patent No.: US 10,447,739 B2
(45) Date of Patent: Oct. 15, 2019

(54) NETWORK ENTITIES COMPRISING INTERWORKING FUNCTIONS, METHODS OF CONTROLLING SAME, AND COMPUTER PROGRAMS

(71) Applicant: Metaswitch Networks Ltd, Enfield (GB)

(72) Inventor: Mark Norman Stewart, Cambridge (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 15/991,757

(22) Filed: May 29, 2018

(65) Prior Publication Data
US 2019/0158543 A1    May 23, 2019

(30) Foreign Application Priority Data

Nov. 23, 2017 (GB) .................................... 1719473.9

(51) Int. Cl.
*H04L 29/06* (2006.01)
*H04L 29/08* (2006.01)

(52) U.S. Cl.
CPC ........ *H04L 65/1006* (2013.01); *H04L 65/105* (2013.01); *H04L 65/1016* (2013.01); *H04L 65/1073* (2013.01); *H04L 67/30* (2013.01)

(58) Field of Classification Search
CPC ............. H04L 65/1006; H04L 65/1016; H04L 65/105; H04L 65/1073
See application file for complete search history.

(56) References Cited

U.S. PATENT DOCUMENTS

| | | | | |
|---|---|---|---|---|
| 8,655,357 B1* | 2/2014 | Gazzard | .................. | H04W 4/20 455/435.1 |
| 9,571,480 B1* | 2/2017 | Asveren | .................. | H04L 63/08 |
| 2007/0253418 A1* | 11/2007 | Shiri | ................. | H04L 29/06027 370/392 |
| 2010/0046502 A1* | 2/2010 | Lei | ...................... | H04L 65/1069 370/352 |
| 2010/0050234 A1* | 2/2010 | Lindholm | ............... | H04W 8/04 726/3 |
| 2010/0111049 A1* | 5/2010 | Siegel | ............... | H04L 29/12188 370/336 |

(Continued)

OTHER PUBLICATIONS

Wikipedia Article: "Session Border Controller" old version page edited at 09:04 Jul. 27, 2017.

(Continued)

*Primary Examiner* — Christopher M Brandt
(74) *Attorney, Agent, or Firm* — EIP US LLP

(57) ABSTRACT

A network entity comprises an interworking function. The network entity is between an endpoint and a registrar in a telecommunications network. A message is received for the registrar from the endpoint, the message comprising data identifying an endpoint characteristic of the endpoint. A message is received for the endpoint. A processing action to be used to process the received message for the endpoint is determined based on the data identifying the endpoint characteristic of the endpoint comprised in the received message for the registrar from the endpoint. The received message for the endpoint is processed in accordance with the determined processing action.

20 Claims, 3 Drawing Sheets

(56) References Cited

U.S. PATENT DOCUMENTS

| | | | | |
|---|---|---|---|---|
| 2011/0314166 A1* | 12/2011 | Axell | ................ | H04L 29/12594 |
| | | | | 709/227 |
| 2013/0089025 A1* | 4/2013 | Titcombe | ............. | H04Q 3/0045 |
| | | | | 370/328 |
| 2014/0032773 A1* | 1/2014 | Peter | ..................... | H04L 67/142 |
| | | | | 709/228 |
| 2014/0047348 A1* | 2/2014 | Stewart | ................ | G06F 3/0484 |
| | | | | 715/738 |
| 2017/0054764 A1* | 2/2017 | Sharma | ............... | H04L 65/1069 |
| 2019/0075139 A1* | 3/2019 | Bouvet | ............... | H04L 65/1006 |

OTHER PUBLICATIONS

Wainhouse Research White Paper: "Session Border Controllers and Videoconferencing: Using a Field-Proven Solution to Simplify and Improve Multi-Vendor Conferencing Environment"; Aug. 2011.
Frafos GmbH: "Understanding Session Border Controllers", Oct. 2012.
M. Bhatia et al.: "SIP Session Border Control Requirements, Draft-bhatia-sipping-sbc-00", Jan. 28, 2005, IETF Standard Working Draft XP015037620.

* cited by examiner

NETWORK ENTITIES COMPRISING INTERWORKING FUNCTIONS, METHODS OF CONTROLLING SAME, AND COMPUTER PROGRAMS

CROSS REFERENCE TO RELATED APPLICATION

This application claims priority under 35 U.S.C. § 119(a) and 37 CFR § 1.55 to United Kingdom patent application no. GB 1719473.9, filed on Nov. 23, 2017, the entire content of which is incorporated herein by reference.

BACKGROUND OF THE INVENTION

Technical Field

The present invention relates to network entities comprising interworking functions, methods of controlling same, and computer programs.

Description of the Related Technology

A telecommunications network may comprise endpoints having different endpoint characteristics. An example of an endpoint characteristic is the vendor of the endpoint. As such, a telecommunications network can comprise endpoints from different vendors. The telecommunications network can include endpoint interoperability functionality such that endpoints from different vendors can be used in the telecommunications network.

For example, a Session Initiation Protocol (SIP) INVITE message can include an Alert-Info header field. When present in a SIP INVITE message, the Alert-Info header field specifies an alternative ringing tone. As such, the Alert-Info header field can be used to request that a destination endpoint provide a distinctive ringing tone. However, different endpoint vendors can implement proprietary, and incompatible, conventions for the content of the Alert-Info header field. For example, an endpoint from one vendor might require that the Alert-Info header field contain one specific value to play a given ringing tone, whereas an endpoint from another vendor might require that the Alert-Info header field contain a different, specific value to play the same ringing tone. As such, different SIP INVITE messages may be used to support interoperability between endpoints from the different vendors.

SUMMARY

According to first embodiments, there is provided a method of controlling a network entity comprising an interworking function, the network entity being between an endpoint and a registrar in a telecommunications network, the method comprising: receiving a message for the registrar from the endpoint, the message comprising data identifying an endpoint characteristic of the endpoint; receiving a message for the endpoint; determining a processing action to be used to process the received message for the endpoint based on the data identifying the endpoint characteristic of the endpoint comprised in the received message for the registrar from the endpoint; and processing the received message for the endpoint in accordance with the determined processing action.

According to second embodiments, there is provided a method of controlling a network entity comprising an interworking function, the network entity being between an endpoint and a registrar in a telecommunications network, the method comprising: receiving a message for the endpoint; identifying an endpoint characteristic of the endpoint based on data comprised in the received message for the endpoint; and processing the received message for the endpoint based on the identified endpoint characteristic of the endpoint.

According to third embodiments, there is provided a method of controlling a network entity comprising an interworking function, the network entity being between an endpoint and a registrar in a telecommunications network, the method comprising: receiving a message for the registrar from the endpoint, the message comprising data identifying an endpoint characteristic of the endpoint; extracting the data identifying the endpoint characteristic of the endpoint from the received message for the registrar from the endpoint; receiving a message for the endpoint; and using the extracted data identifying the endpoint characteristic of the endpoint to process the received message for the endpoint.

According to fourth embodiments, there is provided a method of controlling a network entity comprising an interworking function, the network entity being between an endpoint and a registrar in a telecommunications network, the method comprising: receiving a message for the registrar from the endpoint, the message comprising data identifying an endpoint characteristic of the endpoint; transmitting a message for the registrar based on the received message for the registrar from the endpoint, the transmitted message for the registrar comprising data identifying the endpoint characteristic of the endpoint; receiving a message for the endpoint, the received message for the endpoint comprising data identifying the endpoint characteristic of the endpoint; and using the data identifying the endpoint characteristic of the endpoint comprised in the received message for the endpoint to process the received message for the endpoint.

According to fifth embodiments, there is provided a method of controlling a network entity comprising an interworking function, the network entity being between an endpoint and a registrar in a telecommunications network, the method comprising: receiving a message from the endpoint, the message comprising data identifying an endpoint characteristic of the endpoint; receiving a message for the endpoint; and applying an interworking manipulation to the received message for the endpoint based on the data identifying the endpoint characteristic of the endpoint comprised in the received message from the endpoint.

According to sixth embodiments, there is provided a method of controlling a network entity comprising an interworking function, the network entity being between a Session Initiation Protocol (SIP)-based endpoint and a SIP Registrar in a telecommunications network, the method comprising providing interworking of a message received for the endpoint based on data, received from the endpoint, identifying an endpoint characteristic of the endpoint, wherein the network entity is located at an edge of an IP Multimedia Subsystem (IMS) network and provides Session Border Controller (SBC) functionality and/or Proxy-Call Session Control Function (P-CSCF) functionality.

According to seventh embodiments, there is provided a network entity configured to perform a method according to the first, second, third, fourth, fifth or sixth aspects of the present invention.

According to eighth embodiments, there is provided a computer program arranged, when executed, to perform a method according to the first, second, third, fourth, fifth or sixth aspects of the present invention.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
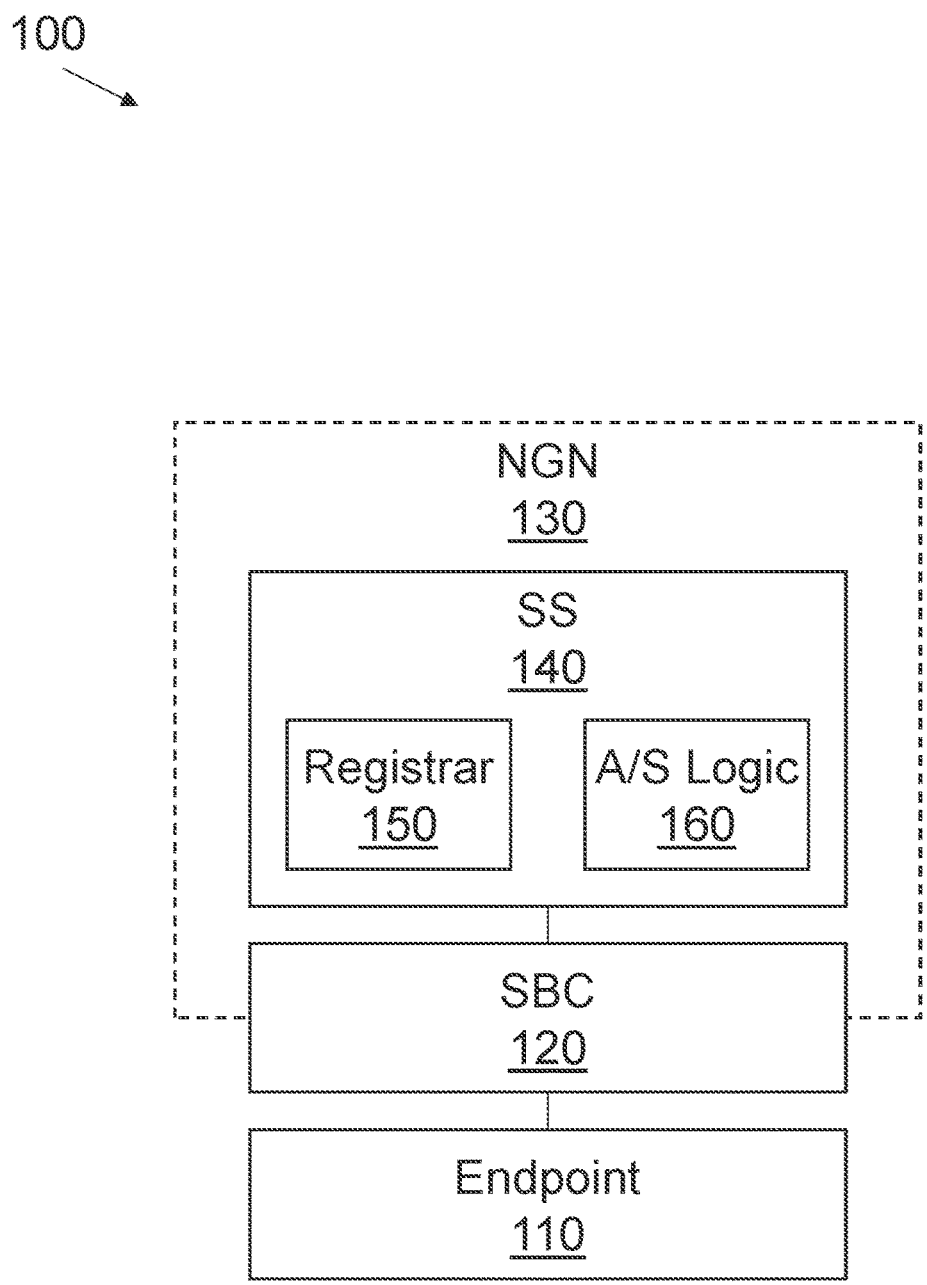
FIG. 1 shows a block diagram of an example of a telecommunications network.

Referring to FIG. 1, there is shown an example of a telecommunications network 100. The telecommunications network 100 is in accordance with a Next-Generation Network (NGN) architecture. An NGN architecture is also known as a Softswitch (SS) architecture. The telecommunications network 100 may be SIP-based. As such, in this example, at least some of the elements of the telecommunications network 100 are operable in accordance with SIP. The telecommunications network 100 may use and/or may be compatible with a communication protocol other than SIP. An example of another such communication protocol is H.323.

The telecommunications network 100 comprises an endpoint 110. In this example, the endpoint 110 is a SIP-based endpoint. An endpoint may correspond to one software element of multiple software elements on a physical device, or may correspond to the physical device itself. An endpoint may correspond to a user device (whether in the form of a software element or a physical device), in that the endpoint is used by a user (for example a subscriber) of the telecommunications network 100.

The telecommunications network 100 comprises a Session Border Controller (SBC) 120. An SBC may be used to provide a secure Voice over Internet Protocol (VoIP) infrastructure, while providing interworking between incompatible signalling messages and media flows. An SBC may provide firewall functionality.

The SBC 120 is located at the edge of an NGN 130.

The NGN 130 comprises an SS 140. An SS may be used to provide call control and media flow processing. An SS may be used in an NGN, or older, architecture. An SS is not used in an IP Multimedia Subsystem (IMS) architecture, as will be described in more detail below.

The SS 140 comprises registrar 150 functionality. The registrar 150 handles endpoint registration for the NGN 130. In this example, in which the telecommunications network 100 is SIP-based, the registrar 150 comprises a SIP Registrar. A SIP Registrar provides a location service based on a received SIP REGISTER message.

The SS 140 also comprises application/service logic 160 functionality.

As such, in the NGN architecture in accordance with which the telecommunications network 100 is arranged, both the registrar 150 and the application/service logic 160 are combined into a single network entity, namely the SS 140.

Registration of the endpoint 110 with the registrar 150 allows the telecommunications network 100 to provide services to the endpoint 110 and to provide endpoint interoperability.

To register with the registrar 150, the endpoint 110 transmits a registration message for the registrar 150 via the SBC 120. In this example, in which the telecommunications network 100 is SIP-based, the registration message comprises a SIP REGISTER message. The registration message comprises data identifying an endpoint characteristic of the endpoint 110. The SS 140 receives the registration message. The SS 140 extracts and stores the data identifying the endpoint characteristic of the endpoint 110 in local memory of the SS 140 in association with the registration of the endpoint 110. The SS 140 also stores an interworking manipulation profile associated with the endpoint characteristic of the endpoint 110. The interworking manipulation profile defines an interworking option (also referred to herein as an "interworking rule") to be used when communicating with the endpoint 110. The interworking rule is used to facilitate provision of endpoint interoperability.

When the SS 140 receives a message for the endpoint 110, the SS 140 identifies the endpoint characteristic of the endpoint 110 based on the registration of the endpoint 110 with the registrar 150 and obtains a corresponding interworking manipulation profile using the identified endpoint characteristic of the endpoint 110.

The application/service logic 160 applies the interworking option associated with the obtained interworking manipulation profile to the received message for the endpoint 110 such that a corresponding transmitted message for the endpoint 110 is compatible with the endpoint 110. In some cases, the received message for the endpoint 110 is compatible with the endpoint 110 in its received form such that no interworking manipulation is applied. In other cases, the received message for the endpoint 110 is not compatible with the endpoint 110 in its received form such that interworking manipulation is applied.

As such, the telecommunications network 100 can provide endpoint interworking in accordance with an NGN architecture.

Figure 2:
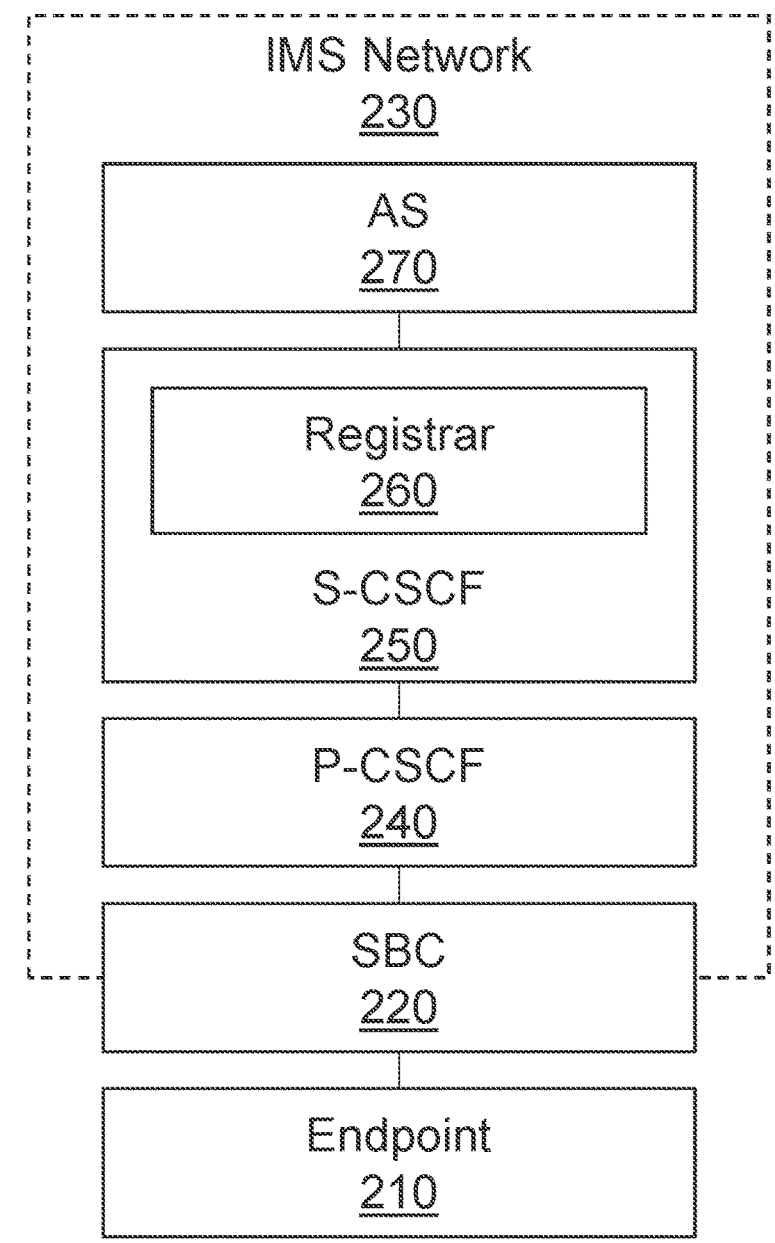
FIG. 2 shows a block diagram of another example of a telecommunications network.

Referring to FIG. 2, there is shown an example of a telecommunications network 200. The telecommunications network 200 is in accordance with an IMS architecture. In this example, the telecommunications network 200 deploys business services. In this example, the telecommunications network 200 is SIP-based. Endpoint interoperability is a particular consideration when deploying business phones, for example SIP-based business phones, in conjunction with an IMS architecture. Deployment of business services over IMS is currently not widespread. The telecommunications network 200 could, however, be used to deploy non-business services, or a mixture of business services and non-business services, using SIP or another communications protocol.

The telecommunications network 200 comprises an endpoint 210. In this example, in which the telecommunications network 200 deploys business services, the endpoint 210 is a business phone. In this specific example, the endpoint 210 is a SIP-based desk phone. The telecommunications network 200 may comprise one or more further endpoints.

In this example, the telecommunications network 200 comprises an SBC 220.

The SBC 220 is located at the edge of an IMS network 230. In this example, the IMS network 230 is an IMS-based Voice over LTE (VoLTE) network.

The IMS network 230 comprises a Proxy-Call State Control Function (P-CSCF) 240. A P-CSCF may be the first contact point for the endpoint 210 within the IMS network 230. A P-CSCF may receive requests, for example from the endpoint 210, and either process them internally or forward them to another entity in the IMS network 230.

In this example, the SBC 220 is deployed in front of the P-CSCF 240, from the perspective of the endpoint 210. In other examples, the SBC 220 is co-located with the P-CSCF 240 in that a single network entity provides both SBC and P-CSCF functionality. For example, the Perimeta® SBC, available from Metaswitch Networks Ltd, combines both SBC and P-CSCF functionality.

Although, in this example, the telecommunications network 200 comprises an SBC, in other examples the telecommunications network 200 does not comprise an SBC. This may be the case when, for example, security features of an SBC are not used in a network, such as when endpoints are connected to a trusted network which provides additional security features at the network layer, for example LTE or PacketCable/DOCSIS.

The IMS network 230 also comprises a Serving-CSCF (S-CSCF) 250. The S-CSCF 250 performs session control services for the endpoint 210. The S-CSCF 250 may maintain session state for support of such services.

The S-CSCF 250 comprises registrar 260 functionality. In this example, in which the telecommunications network 200 is SIP-based, the registrar 260 is a SIP Registrar.

The S-CSCF 250 is operable to perform forking. In this example, the S-CSCF 250 supports SIP forking. SIP forking involves the S-CSCF 250 forking SIP request messages addressed to a shared Address of Record (AOR) to multiple endpoints registered against the shared AOR or a set of related public/private user identities. Multiple endpoint may register against the shared AOR by sending respective SIP REGISTER messages to the S-CSCF 250, where each SIP REGISTER message comprises a specific Contact header field for the respective endpoint. The Contact header field for a given endpoint comprises information to allow new requests to be sent towards that endpoint, such as the endpoint's IP address or an IP address of an intermediate entity. As such, the S-CSCF 250 can map messages addressed to the shared AOR to the individual IP addresses of the individual endpoints associated with the shared registration with the S-CSCF 250.

The IMS network 230 comprises an Application Server (AS) 270. The AS 270 hosts and executes services. The AS 270 provides application-specific logic. The AS 270 interfaces with the S-CSCF 250. The AS 270 can thereby learn about endpoints that register with the registrar 260 comprised in the S-CSCF 250.

In the telecommunications network 200, the S-CSCF 250 (which comprises the registrar 260 functionality) and the AS 270 (which comprises the application-specific logic) are distinct components. An operator of the telecommunications network 200 may, for example, source the S-CSCF 250 and the AS 270 from different vendors. This differs from the single network entity, SS, approach described above with reference to the telecommunications network 100 depicted in FIG. 1 which is in accordance with an NGN architecture. The NGN architecture cannot be simply used in, and is generally not appropriate for, an IMS architecture at least because of the decoupling of the registrar and application-specific logic.

As operators move to an IMS architecture, particularly mobile operators who are deploying VoLTE and seek to offer rich converged (fixed and mobile) services, a different approach to provide endpoint interoperability in the telecommunications network 200 is therefore supported.

Various different approaches to provide endpoint interoperability in the telecommunications network 200 could be taken by implementing an interworking function having specific functionality in the telecommunications network 200. The interworking function manipulates data to provide endpoint interoperability. Examples of such data include, but are not limited to, signalling flows and media flows. The interworking function works based on content of a message (also referred to herein as "message content").

One possible approach to provide endpoint interoperability in the telecommunications network 200 is for the AS 270 to implement the interworking function. However, an interworking function implemented in the AS 270 may not provide reliable interworking for forked SIP messages. This is because the AS 270 is invoked before the S-CSCF 250 performs the forking process, via which the individual endpoints associated with the shared AOR are identified. However, an interworking function in the AS 270 would not be able to format forked messages to be compatible with all endpoints associated with the shared AOR.

Another possible approach to provide endpoint interoperability in the telecommunications network 200, which may be compatible with forking, is for the S-CSCF 250 to implement the interworking function. Since the S-CSCF 250 performs the forking process, the S-CSCF 250 can identify the individual endpoints associated with the shared AOR. The interworking function in the S-CSCF 250 could therefore format forked messages to be compatible with all endpoints associated with the shared AOR. However, as well as being proprietary and not generally being supported by S-CSCFs in the market, putting application-specific logic in a generic component, which is intended to be application-agnostic, goes against general IMS architectural principles.

Another possible approach to provide endpoint interoperability in the telecommunications network 200 is to partition the SBC 220 into multiple SBC partitions. Each SBC partition would be associated with endpoints with different endpoint characteristics. References herein to multiple SBC partitions include the use of multiple different logical partitions of a physical SBC entity, as well as use of multiple different physical SBC entities. For example, an SBC may support multiple logical SBC interfaces out of one physical SBC entity. As such, endpoints could be partitioned across SBCs by endpoint characteristic. In some network configurations, for example when endpoint configuration is managed by a provisioning system, endpoints could be controlled, on a per-endpoint basis, to register through a specific SBC partition. This would allow, for example, all endpoints having a first endpoint characteristic (for example being from vendor A) to register through SBC A and all endpoints having a second endpoint characteristic (for example being from vendor B) to register through SBC B. Each SBC would be configured with interworking rules for the endpoints registering through it. For example, SBC A would be configured with a first set of interworking rules for endpoints having the first endpoint characteristic (for example being from vendor A) and SBC B would be configured with a second set of interworking rules for endpoints having the second endpoint characteristic (for example being from vendor B). The SBC-partitioning approach could also be used in an NGN architecture where interworking cannot be provided in the SS, for example where Secure Sockets Layer (SSL) certificates are used. However, the SBC-partitioning approach may present scalability complexities where many different endpoints are to be supported. For example, each SBC partition may have distinct IP addresses, ports etc. As such, the SBC-partitioning approach may only be effective when the number of partitions is small. This, in turn, limits the variety of endpoint characteristic which can be supported in such a deployment.

As indicated above, endpoint interoperability is a particular consideration when deploying business phones in conjunction with an IMS architecture. Although The 3rd Generation Partnership Project (3GPP) has defined specifications for User Equipment (UE), a business phone may pre-date these specifications. The 3GPP specifications may also not adequately cover desired business features.

Another possible approach to provide endpoint interoperability in the telecommunications network 200 is to limit the service in the telecommunications network 200 to fully standardised features and to endpoints offering compatible implementations. However, this may result in an undesirable service, for example in the context of migrating users and their endpoints from an NGN architecture to IMS in view of the lack of features.

Figure 3:
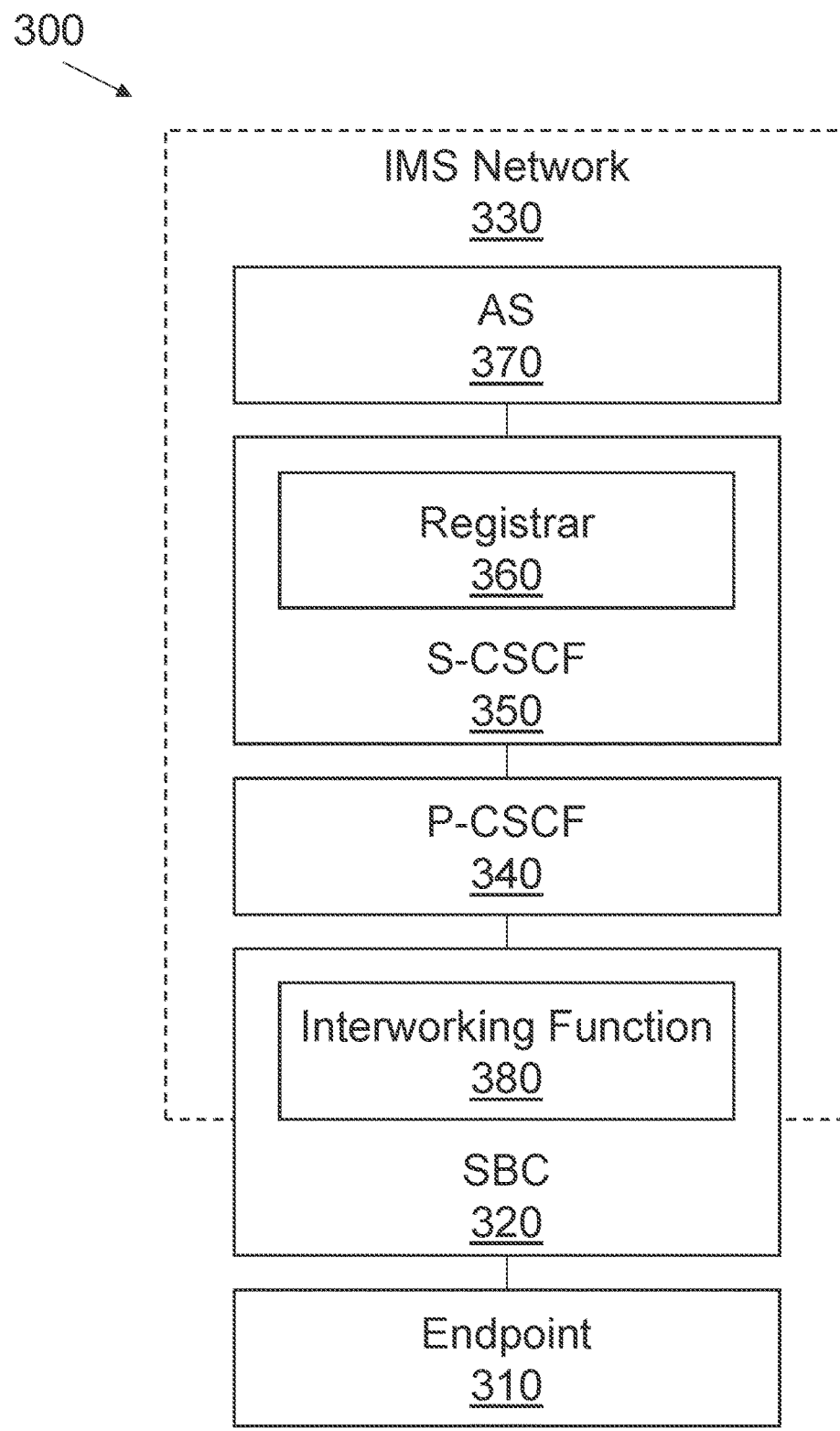
FIG. 3 shows a block diagram of an example of a telecommunications network in accordance with embodiments.

Referring to FIG. 3, there is shown an example of a telecommunications network 300. The telecommunications network 300 comprises several entities that are the same as or are similar to corresponding entities of the telecommunications network 200 described above with reference to FIG. 2. Such entities are shown in FIG. 3 using the same reference numerals as in FIG. 2, but incremented by 100.

As described above, endpoint interoperability may be provided in the telecommunications network 200 by implementing an interworking function in the AS 270, by implementing an interworking function in the S-CSCF 250, by partitioning the SBC 220 into multiple SBCs each having a respective interworking function, and/or by limiting services in the telecommunications network 200 to fully standardised features and to endpoints offering compatible implementations.

In contrast, in the telecommunications network 300, a network entity between the endpoint 310 and the registrar 360 comprises an interworking function 380 that provides specific functionality in accordance with examples described herein. The network entity may be embodied as or one or more physical resources, or as one or more virtualised resources instantiated on one or more physical resources. The network entity may comprise one or more processors and one or more memories. One or more computer programs comprising computer-readable instructions may be stored in the one or more memories. The one or more processors may be configured to execute the computer-readable instructions and perform at least some of the methods and techniques described herein as a result. The interworking function 380 may convert data between a format used within the IMS network 330 and a specific format supported by the endpoint 310.

In this example, the registrar 360 is comprised in a network entity that provides S-CSCF functionality. In this specific example, the registrar 360 is comprised in the S-CSCF 350. As such, the network entity in which the interworking function 380 is comprised is also between the endpoint 310 and the S-CSCF 350.

In this example, the network entity that provides S-CSCF functionality, namely the S-CSCF 350, does not also provide AS functionality. In particular, in this example, the registrar 360 is not comprised in a network entity that provides AS functionality. Furthermore, the network entity in which the interworking function 380 is comprised is between the endpoint 310 and the AS 370, as well as being between the endpoint 310 and the S-CSCF 350.

Furthermore, in this example, the registrar 360 is not comprised in an SS.

In this example, the network entity in which the interworking function 380 is comprised is located at the edge of the IMS network 330. However, the network entity in which the interworking function 380 is comprised could be located within the IMS network 330. For example, the network entity could be located between the P-CSCF 340 and the S-CSCF 350 or could be located in the P-CSCF 340.

The network entity in which the interworking function 380 is comprised may be a SIP Back-to-Back User Agent (B2BUA). A B2BUA differs from a SIP Proxy at least in the degree to which a B2BUA can modify received messages before forwarding them on, with a B2BUA having additional such functionality compared to a SIP Proxy. An SBC may act as a B2BUA.

In this example, the network entity in which the interworking function 380 is comprised provides SBC functionality. In this specific example, the network entity in which the interworking function 380 is comprised is the SBC 320. Known SBCs provide interworking between incompatible signalling message and media flows, but do not comprise an interworking function having the specific functionally in accordance with examples described herein.

The network entity in which the interworking function 380 is comprised may provide additional functionality to SBC functionality or alternative functionality to SBC functionality. For example, the network entity in which the interworking function 380 is comprised may provide P-CSCF functionality. The network entity in which the interworking function 380 is comprised may provide P-CSCF functionality in addition to or as an alternative to providing SBC functionality. As such, the network entity in which the interworking function 380 is comprised may provide SBC and/or P-CSCF functionality, or neither SBC nor P-CSCF functionality. Further, and as explained above, the network entity in which the interworking function 380 is comprised may be located within or at the edge of the IMS network 330.

One possible approach to provide endpoint interoperability in the telecommunications network 300 is for the interworking function 380 to determine an interworking manipulation to apply to a received message for the endpoint 310 according to local, static configuration for the endpoint 310 stored in the SBC 320. Examples of local static configuration include, but are not limited to, the port of the SBC 320 on which the message for the endpoint 310 is received on and the port of the SBC 320 on which a corresponding message for the endpoint 310 is transmitted to the endpoint 310. This approach may be effective where the endpoint 310 is statically configured in the telecommunications network 300 such that the SBC 320 always has local, static configuration for the endpoint 310. However, this approach may not be effective where the endpoint 310 dynamically registers with the IMS network 330, since the SBC 320 does not have local, static configuration for the endpoint 310. The interworking function 380 comprised in the SBC 320 cannot therefore determine which interworking manipulation to apply to the received message for the endpoint 310.

Although such an SBC could provide interworking between incompatible signalling message and media flows for statically configured endpoints, in accordance with examples described herein, the interworking function 380 can provide endpoint interoperability for endpoints that register with the IMS network 330 dynamically. As such, and in contrast to scenarios in which endpoints are statically configured and do not register dynamically with the IMS network 330, the interworking function 380 provides endpoint interoperability where no per-endpoint local, static configuration is available in the SBC 320 for use by the interworking function 380 in relation to the endpoint 310.

As such, the SBC 320 supports interworking for a plurality of endpoints having different endpoint characteristics. In particular, the SBC 320 supports interworking for endpoints having different endpoint characteristics and that register dynamically with the IMS network 330.

Such an interworking function 380, in accordance with examples described herein, can be deployed and/or updated for a collection of new endpoints with limited disruption to an existing IMS deployment. For example, the interworking function 380 may be able to provide interworking for statically configured endpoints, in addition to dynamically configured endpoints.

In accordance with examples described herein, the interworking function 380 of the SBC 320 provides endpoint interoperability by using data identifying an endpoint characteristic of the endpoint 310 to determine how to process a received message for the endpoint 310, where such data is comprised in a message received from the endpoint 310. This differs from the above-mentioned approach in which an interworking function uses local, static configuration to apply interworking.

The SBC 320 receives a message for the registrar 360 from the endpoint 310. The received message for the registrar 360 from the endpoint 310 comprises data identifying an endpoint characteristic of the endpoint 310. The received message from the endpoint 310 is for the registrar 360 in that the registrar 360 is an intended destination for the message. As will be described in more detail below, the SBC 320 may or may not transmit the received message to the registrar 360.

The endpoint characteristic of the endpoint 310 may be a type of the endpoint 310. The type of the endpoint 310 may relate to a vendor of the endpoint 310. The type of the endpoint 310 may relate to a model of the endpoint 310. The type of the endpoint 310 may relate to a firmware version of the endpoint 310.

The endpoint characteristic of the endpoint 310 may be a characteristic of the endpoint 310 other than the type of the endpoint 310. Examples of such other characteristic include, but are not limited to, location of the endpoint and age of the endpoint.

The received message for the registrar 360 from the endpoint 310 may be a SIP request. Examples of such SIP requests include, but are not limited to, SIP REGISTER and SIP SUBSCRIBE messages.

The data identifying the endpoint characteristic of the endpoint 310 may be comprised in an endpoint type header of the received message for the registrar 360 from the endpoint 310. In some examples, the received message for the registrar 360 from the endpoint 310 is a registration message to register the endpoint 310 with the registrar 360. The registration message may be a SIP REGISTER message. A SIP REGISTER message can contain a User-Agent header field. A User-Agent header field is an example of an endpoint type header. The User-Agent header field contains endpoint characteristic information. The User-Agent header field value may, for example, indicate the vendor, model, firmware version etc of the endpoint 310. Endpoint vendors may, for example, adopt a convention where the User-Agent header field value is a string in the following format: <vendor> <model> <firmware version>. In some examples, one or more strings are associated with each interworking manipulation profile. The one or more strings may be used for matching against the User-Agent header field value. An algorithm may be used to match a received User-Agent header field value to an interworking manipulation profile string. Examples of such algorithms include, but are not limited to, longest match, regular expressions etc.

The endpoint 310 may transmit a message for the registrar 360, for example a SIP REGISTER message, to create a new registration with the registrar 360. Such a message may therefore be associated with registering the existence of the endpoint 310. Alternatively, the endpoint 310 may transmit a message for the registrar 360, for example a SIP REGISTER message, to refresh an existing registration with the registrar 360. Such a message may therefore be associated with registering the presence of the endpoint 310.

The received message for the registrar 360 from the endpoint 310 may not be a SIP request message. For example, where the endpoint 310 is not SIP-based or is not fully compliant with SIP, the endpoint 310 may transmit an initial message for the registrar 360 that does not comprise data identifying the endpoint characteristic of the endpoint 310. The SBC 320 could recognise the absence of such data in the received message for the registrar 360 and request such data from the endpoint 310. The endpoint 310 could then follow up with a further message for the registrar 360 comprising data identifying the endpoint characteristic of the endpoint 310.

In some examples, the SBC 320 transmits a message for the registrar 360. The transmitted message for the registrar 360 is based on the received message for the registrar 360 from the endpoint 310.

In some examples, the transmitted message for the registrar 360 comprises data identifying the endpoint characteristic of the endpoint 310. The data identifying the endpoint characteristic of the endpoint 310 comprised in the transmitted message for the registrar 360 may be the same as, or different from, the data identifying the endpoint characteristic of the endpoint 310 comprised in the received message for the registrar 360 from the endpoint 310. The data identifying the endpoint characteristic of the endpoint 310 comprised in the transmitted message for the registrar 360 may be derived from the data identifying the endpoint characteristic of the endpoint 310 comprised in the received message for the registrar 360 from the endpoint 310.

The data identifying the endpoint characteristic of the endpoint 310 comprised in the transmitted message for the registrar 360 may be comprised in a source header of the transmitted message for the registrar 360. In some examples, the transmitted message for the registrar 360 is a registration message to register the endpoint 310 with the registrar 360. The registration message may be a SIP REGISTER message. A SIP REGISTER message can contain a Contact header field. A Contact header field is an example of a source header. The Contact header field provides a SIP Uniform Resource Identifier (URI) that can be used to contact the endpoint 310 for subsequent SIP requests. The SBC 320 can encode data identifying the endpoint characteristic of the endpoint 310 within the Contact header field. When the SBC 320 receives a subsequent SIP request message for the endpoint 310, the SIP request message may comprise the encoded data identifying the endpoint characteristic of the endpoint 310 (and/or data derived therefrom), which the SBC 320 can then decode to identify the endpoint characteristic of the endpoint 310.

The data identifying the endpoint characteristic of the endpoint 310 could, alternatively or additionally, be provided in a header field other than the Contact header field. For example, the data identifying the endpoint characteristic of the endpoint 310 could be provided in the Path SIP header field. A Path SIP header field is an example of a route header.

In some examples, the transmitted message for the registrar 360 does not comprise data identifying the endpoint characteristic of the endpoint 310.

In some examples, the SBC 320 stores data identifying the endpoint characteristic of the endpoint 310. The SBC 320 may store the data identifying the endpoint characteristic of the endpoint 310 in local memory, or otherwise. The local memory may be Random-Access memory (RAM) of the SBC 320. The SBC 320 may store the data identifying the endpoint characteristic of the endpoint 310 in scenarios in which the transmitted message for the registrar 360 does comprises data identifying the endpoint characteristic of the endpoint 310 and/or in scenarios in which the transmitted message for the registrar 360 does not comprise data identifying the endpoint characteristic of the endpoint 310. As such, the stored data identifying the endpoint characteristic of the endpoint 310 may be subsequently made available to the interworking function 380.

In addition to storing the data identifying the endpoint characteristic of the endpoint 310, which is comprised in the received message for the registrar 360 from the endpoint 310, the SBC 320 may store other data comprised in the received message for the registrar 360 from the endpoint 310. The SBC 320 may make such other data available for subsequent use by the interworking function 380. For example, the received message for the registrar 360 from the endpoint 310 may comprise IP address data associated with the endpoint 310. The SBC 320 may store the IP address data to allow messages to be forwarded to the endpoint 310. The SBC 320 may store the IP address data to perform another function. Examples of such other functions include, but are not limited, to whitelisting, Network Address Translation (NAT) traversal, and firewall traversal.

In some examples, the SBC 320 retrieves data identifying the endpoint characteristic of the endpoint 310 from local memory.

As indicated above, in some examples, the SBC 320 transmits a message for the registrar 360, the transmitted message for the registrar 360 being based on the received message for the registrar 360 from the endpoint 310. In other examples, the SBC 320 receives the message for the registrar 360 from the endpoint 310, but does not transmit a message for the registrar 360 based on the received message for the registrar 360 from the endpoint 310. For example, the SBC 320 may have transmitted a message to the endpoint 310 to trigger the endpoint to send the message for the registrar 360 from the endpoint 310, specifically to allow the SBC 320 to discover the endpoint characteristic of the endpoint 310.

The SBC 320 receives a message for the endpoint 310.

In some examples, SBC 320 receives the message for the endpoint 310 from the registrar 360.

In some examples, the received message for the endpoint 310 comprises data identifying the endpoint characteristic of the endpoint 310.

The data identifying the endpoint characteristic of the endpoint 310 comprised in the received message for the endpoint 310 may be comprised in a destination header of the received message for the endpoint 310. The received message for the endpoint 310 may be a SIP request. Examples of such SIP requests include, but are not limited to, SIP INVITE and SIP NOTIFY messages.

The received message for the endpoint 310 may be a SIP INVITE message. A SIP INVITE message contains a To header field. A To header field is an example of a destination header. The To header field contains a SIP URI associated with the endpoint 310.

A SIP INVITE message also contains a Request-Line. The Request-Line contains a Request-URI. The Request-URI is a SIP URI. In the case of a SIP INVITE message, the Request-URI may be set to the value received in the Contact header field at registration.

A SIP NOTIFY message may be used to cause a SIP-based endpoint to restart. A SIP NOTIFY message can alternatively or additionally be used to check configuration of the endpoint 310. Such SIP NOTIFY messages may need to be formatted differently for endpoints having different endpoint characterises. As such, the received message for the endpoint 310 can, but need not, be directly related to establishment of a communications session with the endpoint 310.

In some examples, the received message for the endpoint 310 does not comprise data identifying the endpoint characteristic of the endpoint 310. For example, where the transmitted message for the registrar 360 does not comprise data identifying the endpoint characteristic of the endpoint 310, the received message for the endpoint 310 may not comprise data identifying the endpoint characteristic of the endpoint 310.

In some examples, the endpoint 310 and a further endpoint (not shown) are both associated with a shared registration with the registrar 360. For example, as explained above, the endpoint 310 and a further endpoint may both be associated with a shared telecommunications identifier. An example of such a shared telecommunications identifier is a shared AOR. The SBC 320 may receive the message for the endpoint 310 following a forking process performed by the registrar 360 in relation to the shared registration.

The SBC 320 determines a processing action to be used to process the received message for the endpoint 310 based on the data identifying the endpoint characteristic of the endpoint 310 comprised in the received message for the registrar 360 from the endpoint 310. For example, the SBC 320 may store such data in association with an identity of the endpoint 310 and perform a lookup using an identity of the endpoint 310 comprised in a received message for the endpoint 310 to identify such data for use in processing the received message for the endpoint 310. Alternatively, or additionally, the SBC 320 may include such data in a message transmitted to the registrar 360, receive a message for the endpoint 310 which comprises such data, and use the data comprised in the received message for the endpoint 310 in processing the received message for the endpoint 310. As such processing of the received message for the endpoint 310 is based on the data identifying the endpoint characteristic of the endpoint 310 comprised in the received message for the registrar 360 from the endpoint 310, for example by extracting and storing the data and/or by forwarding the data to another network entity and subsequently receiving the data in another message. The SBC 320 processes the received message for the endpoint 310 in accordance with the determined processing action.

In some examples, the determined processing action comprises transmitting a message for the endpoint 310. In such examples, the SBC 320 processes the received message for the endpoint 310 by transmitting a message for the endpoint 310. The transmitted message for the endpoint 310 may be based on the received message for the endpoint 310.

The SBC 320 may identify an interworking manipulation based on the endpoint characteristic of the endpoint 310. The SBC 320 may generate the message for the endpoint 310, which is transmitted to the endpoint 310, by applying the identified interworking manipulation to the received message for the endpoint 310.

The SBC 320 may identify the interworking manipulation by obtaining an interworking manipulation profile associated with the endpoint characteristic of the endpoint 310. The interworking manipulation profile identifies the interworking manipulation. The interworking manipulation profile may identify a plurality of interworking manipulations. The interworking manipulation profile may correspond to a distinct set of manipulation rules. As such, the SBC 320 can use the interworking manipulation profile to apply interworking.

The interworking manipulation profile may comprise conversion information associated with converting between a non-endpoint-specific format and an endpoint-specific format. The non-endpoint-specific format may be a normalised format used within the IMS network 330.

The SBC 320 may obtain the interworking manipulation profile from amongst a plurality of interworking manipulation profiles. Different interworking manipulation profiles in the plurality of interworking manipulation profiles may be associated with different endpoint characteristics. As such, plurality of interworking manipulation profiles may be stored in association with each other. For example, the plurality of interworking manipulation profiles may be stored in a database. The plurality of interworking manipulation profiles may correspond to a collection of interworking manipulation profiles, each being associated with different endpoint characteristics. The plurality of interworking manipulation profiles may serve as a reference of known, good configurations for endpoints having such endpoint characteristics.

The SBC 320 may obtain the interworking manipulation profile via a management interface of the SBC 320. The management interface may provide a relatively efficient mechanism for providing interworking manipulation profiles, for example in terms of simplicity and/or speed. The management interface may be used, for example, to add a new interworking manipulation profile for example when an endpoint having a new endpoint characteristic is available. The management interface offers a mechanism whereby the contents of the interworking manipulation profile can be manually copied from the database (e.g. as a block of text) and then pasted into the SBC management interface.

The SBC 320 may obtain the interworking manipulation profile from memory of the SBC 320. The SBC 320 may, for example, be preloaded with one or more interworking manipulation profiles associated with common endpoint characteristics.

The SBC 320 may obtain the interworking manipulation profile from an interworking manipulation profile repository. The interworking manipulation profile repository may be in the form of a central database. The SBC 320 may obtain the interworking manipulation profile from the interworking manipulation profile repository in response to determining that the SBC 320 does not have an interworking manipulation profile associated with the endpoint characteristic of the endpoint 310. The SBC 320 may automatically fetch an interworking manipulation profile proactively, for example by regularly searching for new and/or updated interworking manipulation profiles. The SBC 320 may automatically fetch an interworking manipulation profile reactively, for example when an endpoint having a previously unseen endpoint characteristic attempts to register with the registrar 360. As such, the SBC 320 may fetch some or all interworking manipulation profiles in advance, or dynamically when an endpoint having a previously unseen endpoint characteristic attempts to register with the registrar 360.

The SBC 320 may be operable to provide data identifying the endpoint characteristic of the endpoint 310 to another network entity. An example of another such network entity is another SBC, for example a physical instance of an SBC or a logical instance of an SBC. For example, the endpoint 310 may be initially associated with the SBC 320, for example during registration, but may subsequently become associated with another SBC, for example in view of load balancing, handovers etc. For example, a handover protocol could allow one SBC to move traffic to another SBC. The SBC 320 could thereby enable the other SBC to provide interworking in relation to the endpoint 310 even if the endpoint 310 does not transmit a message comprising data identifying the endpoint characteristic of the endpoint 310 via the other SBC.

Various measures (for example methods, network entities and computer programs) are provided in relation to controlling a network entity comprising an interworking function. The network entity is between an endpoint and a registrar in a telecommunications network. The network entity receives a message for the registrar from the endpoint. The message comprises data identifying an endpoint characteristic of the endpoint. The network entity receives a message for the endpoint. The network entity determines a processing action to be used to process the received message for the endpoint based on the data identifying the endpoint characteristic of the endpoint comprised in the received message for the registrar from the endpoint. The network entity processes the received message for the endpoint in accordance with the determined processing action.

As such, interworking may be provided in a telecommunications network: in which registrar and application/service logic are implemented in separate components, such that forking is supported, in accordance with architectural principles of the network, in a scalable manner, with support for a range of features and/or for endpoints that register dynamically. Compared to the SBC-partitioning approach described above, the approach provided in accordance with examples described herein may provide easier-to-manage endpoint interoperability in telecommunications networks with endpoints having many different endpoint characteristics. All endpoints may be able to register with the registrar via a shared interface, for example of an SBC. Endpoints having new endpoint characteristics, may be supported by configuring the appropriate interworking manipulation profile, for example into the SBC. Further, migration from an existing SS deployment may be facilitated. Endpoints may already be registering via a shared interface, for example a shared SBC interface in the existing SS deployment. Such endpoints can all be redirected to an IMS network. For example, Domain Name System (DNS) entries may be updated, the SBC may be reconfigured to forward traffic to the IMS network rather than to the SS etc.

As explained above, the network entity may be located within or at an edge of an IMS network. As such, endpoint interoperability may be provided in a wider variety of network architectures than just those in accordance with the NGN architecture, in particular in network architectures in which registrar and application-specific functionality are decoupled.

The network entity may provide SBC and/or P-CSCF functionality. This may facilitate support of forking in the telecommunications network and or greater conformity with general architectural principles of the telecommunications network compared to the interworking function being comprised in another type of network entity, for example an AS or S-CSCF.

The data identifying the endpoint characteristic of the endpoint may be comprised in an endpoint type header of the received message for the registrar from the endpoint. This facilitates recognition of the endpoint characteristic of the endpoint by the network entity. In particular, the network entity can identify the endpoint characteristic in a well-defined, predetermined manner.

The network entity may transmit a message for the registrar. The transmitted message for the registrar may be based on the received message for the registrar from the endpoint. As such, the network entity may operate transparently in the telecommunications network by making use of data comprised in the received message for the registrar from the endpoint, but still forward a corresponding message for the registrar such that processing in the telecommunications network is not adversely affected.

The transmitted message for the registrar may comprise data identifying the endpoint characteristic of the endpoint. This may facilitate less stateful operation of the network entity. In particular, the network entity may not need to store the data identifying the endpoint characteristic of the endpoint as it can be carried in a message communicated to another network entity, and stored elsewhere in the telecommunications network. This may also reduce the amount of memory used by the network element to implement the techniques described herein.

The data identifying the endpoint characteristic of the endpoint may be comprised in a source header and/or a route header of the transmitted message for the registrar. This facilitates recognition of the endpoint characteristic of the endpoint by the network entity and/or other network entities. In particular, the endpoint characteristic can be identified in a well-defined, predetermined manner.

The transmitted message for the registrar may not comprise data identifying the endpoint characteristic of the endpoint. As such, the transmitted message may comprise less data compared to a transmitted message in which the endpoint characteristic of the endpoint is identified. This can reduce bandwidth requirements in the telecommunications network, particularly where the network entity is involved in processing large numbers of messages. Data identifying the endpoint characteristic of the endpoint may, instead, be stored in the network entity.

The network entity may store data identifying the endpoint characteristic of the endpoint in memory of the network entity. This can result in more efficient usage of bandwidth between the network entity and other network entities in the telecommunications network, in that data identifying the endpoint characteristic of the endpoint can be stored in memory of the network entity for later use by the network entity. The network entity may, however, both include data identifying the endpoint characteristic of the endpoint in a transmitted message and store data identifying the endpoint characteristic of the endpoint in memory of the network entity. This can provide a relatively robust approach to implement the techniques described herein, for example in case data identifying the endpoint characteristic of the endpoint in a transmitted message is stripped out by a downstream network entity etc.

The network entity may retrieve data identifying the endpoint characteristic of the endpoint from memory of the network entity. As such, the network entity may not be reliant upon receiving the data identifying the endpoint characteristic of the endpoint from another network entity. This can facilitate more efficient usage of bandwidth in the telecommunications network and/or provide a relatively robust mechanism for implementing the techniques described herein.

The received message for the endpoint may be received from the registrar. As such, interworking may be applied after forking processing has taken place at the registrar, for forked communications. This, in turn, can provide more reliable interworking for endpoints having different endpoint characteristics.

The received message for the endpoint may comprise data identifying the endpoint characteristic of the endpoint. Where the network entity stores data identifying the endpoint characteristic of the endpoint, this provides a relatively robust mechanism, for example in case the data identifying the endpoint characteristic of the endpoint that was stored in memory is no longer present in the memory for any reason. Where the network entity does not store data identifying the endpoint characteristic of the endpoint, the network entity can use the data identifying the endpoint characteristic of the endpoint comprised in the received message for the endpoint to apply interworking. This may allow the network entity to operate in a relatively stateless manner.

The data identifying the endpoint characteristic of the endpoint may be comprised in a destination header of the received message for the endpoint. This facilitates recognition of the endpoint characteristic of the endpoint by the network entity. In particular, the endpoint characteristic can be identified in a well-defined, predetermined manner.

The received message for the endpoint may not comprise data identifying the endpoint characteristic of the endpoint. Where the network entity stores data identifying the endpoint characteristic of the endpoint, this enables relatively efficient usage of bandwidth in the telecommunications network.

The determined processing action may comprise transmitting a message for the endpoint. The transmitted message for the endpoint may be based on the received message for the endpoint. As such, interoperability may be provided in relation to messages transmitted to the endpoint.

The network entity may identify an interworking manipulation based on the endpoint characteristic of the endpoint. The network entity may generate the message for the endpoint by applying the identified interworking manipulation to the received message for the endpoint. This can provide a well-defined mechanism for applying interworking in the telecommunications network.

The network entity may identify the interworking manipulation by obtaining an interworking manipulation profile associated with the endpoint characteristic of the endpoint. The interworking manipulation profile may identify the interworking manipulation. This facilitates application of an appropriate interworking manipulation with respect to the particular endpoint.

The interworking manipulation profile may comprise conversion information associated with converting between a non-endpoint-specific format and an endpoint-specific format. As such, the network entity may reliably provide endpoint-specific data while still enabling the endpoint to use a more generic data format, for example used in a core network.

The interworking manipulation profile may be obtained from amongst a plurality of interworking manipulation profiles. Different interworking manipulation profiles in the plurality of interworking manipulation profiles may be associated with different endpoint characteristics. As such, a set of pre-existing interworking manipulation profiles may be provided, for example for use with common endpoints. This can reduce latency compared to an approach in which the network entity determines how to apply interworking on-the-fly.

The endpoint and a further endpoint may both be associated with a shared registration with the registrar. The techniques described herein may be compatible in relation to forked communications.

The endpoint and the further endpoint may both be associated with a shared Address of Record (AOR). The AOR may be associated with the shared registration. As such, the network entity may be able to handle messages relating to forked communications.

The received message for the endpoint may be received following a forking process performed by the registrar in relation to the shared registration. As such, the techniques described herein may be used in relation to forked communications, which may not be possible in other possible approaches.

The network entity may support interworking for a plurality of endpoints having different endpoint characteristics. This may facilitate scalability, compared to an approach in which the network entity supports interworking for only a specific endpoint characteristic The endpoint characteristic of the endpoint may be a type of the endpoint. This provides a reliable parameter on which to decide how to process a message received for an endpoint. In particular, the type of the endpoint may be particularly indicative of how interworking should be applied.

The type of the endpoint may relate to a vendor of the endpoint, a model of the endpoint, and/or a firmware version of the endpoint. This provides a relatively flexible approach in terms of how interworking is provided, while using a parameter that is likely to be indicative of how interworking should be applied in relation to the endpoint. This, in turn, may increase reliability of the interworking applied in the telecommunications network.

The registrar may be comprised in a network entity that provides S-CSCF functionality. Since the network entity would be between the S-CSCF and the endpoint, the network entity may support interworking for forked communications while still allowing the telecommunications network to be deployed in accordance with general architectural principles.

The network entity that provides S-CSCF functionality may not provide AS functionality. As such, the techniques described herein may be used in an architecture in which registrar and AS functionality are decoupled, for example in an IMS architecture.

At least one of the messages may be in accordance with SIP. Given the structured format of SIP, identification of relevant data in messages may be facilitated compared to other, for example, proprietary formats. Further, SIP messages can be used in non-SS architectures, for example in an IMS architecture.

Various measures (for example methods, network entities and computer programs) are provided in relation to controlling a network entity comprising an interworking function. The network entity is between an endpoint and a registrar in a telecommunications network. The network entity receives a message for the endpoint. The network entity identifies an endpoint characteristic of the endpoint based on data comprised in the received message for the endpoint. The network entity processes the received message for the endpoint based on the identified endpoint characteristic of the endpoint.

Various measures (for example methods, network entities and computer programs) are provided in relation to controlling a network entity comprising an interworking function. The network entity is between an endpoint and a registrar in a telecommunications network. The network entity receives a message for the registrar from the endpoint. The message comprises data identifying an endpoint characteristic of the endpoint. The network entity extracts the data identifying the endpoint characteristic of the endpoint from the received message for the registrar from the endpoint. The network entity receives a message for the endpoint. The network entity uses the extracted data identifying the endpoint characteristic of the endpoint to process the received message for the endpoint.

Various measures (for example methods, network entities and computer programs) are provided in relation to controlling a network entity comprising an interworking function. The network entity is between an endpoint and a registrar in a telecommunications network. The network entity receives a message for the registrar from the endpoint. The message comprises data identifying an endpoint characteristic of the endpoint. The network entity transmits a message for the registrar based on the received message for the registrar from the endpoint. The transmitted message for the registrar comprises data identifying the endpoint characteristic of the endpoint. The network entity receives a message for the endpoint. The received message for the endpoint comprising data identifying the endpoint characteristic of the endpoint. The network entity uses the data identifying the endpoint characteristic of the endpoint comprised in the received message for the endpoint to process the received message for the endpoint.

Various measures (for example methods, network entities and computer programs) are provided in relation to controlling a network entity comprising an interworking function. The network entity is between an endpoint and a registrar in a telecommunications network. The network entity receives a message from the endpoint. The message comprises data identifying an endpoint characteristic of the endpoint. The network entity receives a message for the endpoint. The network entity applies an interworking manipulation to the received message for the endpoint based on the data identifying the endpoint characteristic of the endpoint comprised in the received message from the endpoint.

Various measures (for example methods, network entities and computer programs) are provided in relation to controlling a network entity comprising an interworking function. The network entity is between an SIP-based endpoint and a SIP Registrar in a telecommunications network. The network entity provides interworking of a message received for the endpoint based on data, received from the endpoint, identifying an endpoint characteristic of the endpoint. The network entity is located at an edge of an IMS network and provides SBC functionality and/or P-CSCF functionality.

The above embodiments are to be understood as illustrative examples of the invention. Further embodiments of the invention are envisaged.

In examples described above, the interworking function 380 is comprised in a network entity, for example the SBC 320, which is between the endpoint 320 and the registrar 360. In such examples, the interworking function 380 is in front of the registrar 360, from the perspective of the endpoint 310. In other examples, the interworking function 380 is comprised in a network entity which is behind the registrar 360, from the perspective of the endpoint 310. For example, the interworking function 380 may be comprised in the AS 370. The AS 370 would comprise forking logic, instead of the forking logic being implemented in the S-CSCF 350. Standardized mechanisms, such as Globally Routable User Agent (UA) URIs (GRUUs), may allow the AS 370 to direct messages to specific endpoints. However, endpoints, particularly those relevant to business services and/or the IMS core, may not support the SIP extensions that would allow GRUUs to operate in this manner. Additional interworking, for example at the SBC 320 would then be involved. Furthermore, the AS 370 would need to be the final AS in the terminating Initial Filter Criteria (iFC) chain. Otherwise, downstream ASs could receive forked copies of messages from the AS 370. This may be undesirable, particularly in relation to converged Unified Communications (UC), when another AS such as a Service Centralization and Continuity Application Server (SCC-AS) also needs to be the final AS in the iFC chain. This may be in addition to the potential lack of supported for forked communications.

In examples described above, the interworking function 380 is comprised in a network entity, for example the SBC 320, which is between the endpoint 320 and the registrar 360 to support forking, for example SIP forking. However, the interworking function 380 can be used to proceed non-forked communications.

In examples described above, the telecommunications network in which the interworking function 380 is comprised is in accordance with an IMS architecture. However, the interworking function 380 could be provided in a telecommunications network in accordance with another architecture. For example, as described above, an interworking function could be provided in an SBC in a telecommunications network in accordance with an NGN architecture where interworking cannot be provided in the SS, for example where SSL certificates are used. In such an example, the network entity in which the interworking function would be comprised, namely the SBC, is between the registrar (which is comprised in the SS) and the endpoint.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling a network entity comprising an interworking function, the network entity being between an endpoint and a registrar in a telecommunications network, the method comprising:
receiving, by the network entity, a message for the registrar from the endpoint, the message comprising data identifying an endpoint characteristic of the endpoint;
receiving, by the network entity, a message for the endpoint;
determining, by the network entity, a processing action to be used to process the received message for the endpoint based on the data identifying the endpoint characteristic of the endpoint comprised in the received message for the registrar from the endpoint; and
processing, by the network entity, the received message for the endpoint in accordance with the determined processing action.

2. The method of claim 1, wherein the network entity is located within or at an edge of an IP Multimedia Subsystem (IMS) network.

3. The method of claim 1, wherein the network entity provides Session Border Controller (SBC) functionality.

4. The method of claim 1, wherein the network entity provides Proxy-Call Session Control Function (P-CSCF) functionality.

5. The method of claim 1, comprising transmitting a message to the registrar, the transmitted message to the registrar being based on the received message for the registrar from the endpoint.

6. The method of claim 5, wherein the transmitted message to the registrar comprises data identifying the endpoint characteristic of the endpoint.

7. The method of claim 5, wherein the transmitted message to the registrar does not comprise data identifying the endpoint characteristic of the endpoint.

8. The method according to claim 1, comprising:
storing data identifying the endpoint characteristic of the endpoint in memory of the network entity; and
retrieving the stored data identifying the endpoint characteristic of the endpoint from the memory of the network entity.

9. The method of claim 1, wherein the received message for the endpoint is received from the registrar.

10. The method of claim 1, wherein the received message for the endpoint comprises data identifying the endpoint characteristic of the endpoint.

11. The method of claim 1, wherein the received message for the endpoint does not comprise data identifying the endpoint characteristic of the endpoint.

12. The method of claim 1, wherein the determined processing action comprises transmitting a message to the endpoint, the transmitted message to the endpoint being based on the received message for the endpoint.

13. The method of claim 12, comprising:
identifying an interworking manipulation based on the endpoint characteristic of the endpoint; and
generating the message that is transmitted to the endpoint by applying the identified interworking manipulation to the received message for the endpoint.

14. The method of claim 1, wherein the endpoint and a further endpoint are both associated with a shared registration with the registrar.

15. The method of claim 14, wherein the endpoint and the further endpoint are both associated with a shared Address of Record (AOR), the shared AOR being associated with the shared registration.

16. The method of claim 15, wherein the received message for the endpoint is received following a forking process performed by the registrar in relation to the shared registration.

17. The method of claim 1, wherein the endpoint characteristic of the endpoint is a type of the endpoint, wherein the type of the endpoint relates to:
a vendor of the endpoint;
a model of the endpoint; and/or
a firmware version of the endpoint.

18. The method of claim 1, wherein the registrar is comprised in a network entity that provides Serving-Call Session Control Function (S-CSCF) functionality.

19. The method of claim 18, wherein the network entity that provides S-CSCF functionality does not provide Application Server (AS) functionality.

20. A network entity comprising:
at least one processor; and
at least one memory including computer program code,
the at least one memory and the computer program code being configured to, with the at least one processor, cause the network entity at least to perform a method of controlling a network entity comprising an interworking function, the network entity being between an endpoint and a registrar in a telecommunications network, the method comprising:

receiving a message for the registrar from the endpoint, the message comprising data identifying an endpoint characteristic of the endpoint;

receiving a message for the endpoint;

determining a processing action to be used to process the received message for the endpoint based on the data identifying the endpoint characteristic of the endpoint comprised in the received message for the registrar from the endpoint; and processing the received message for the endpoint in accordance with the determined processing action.

* * * * *